Oct. 2, 1951   E. L. STACEY   2,569,873
METHOD OF SETTING OF TOOL FOR BRAKE DRUM MACHINING
Filed Nov. 7, 1947
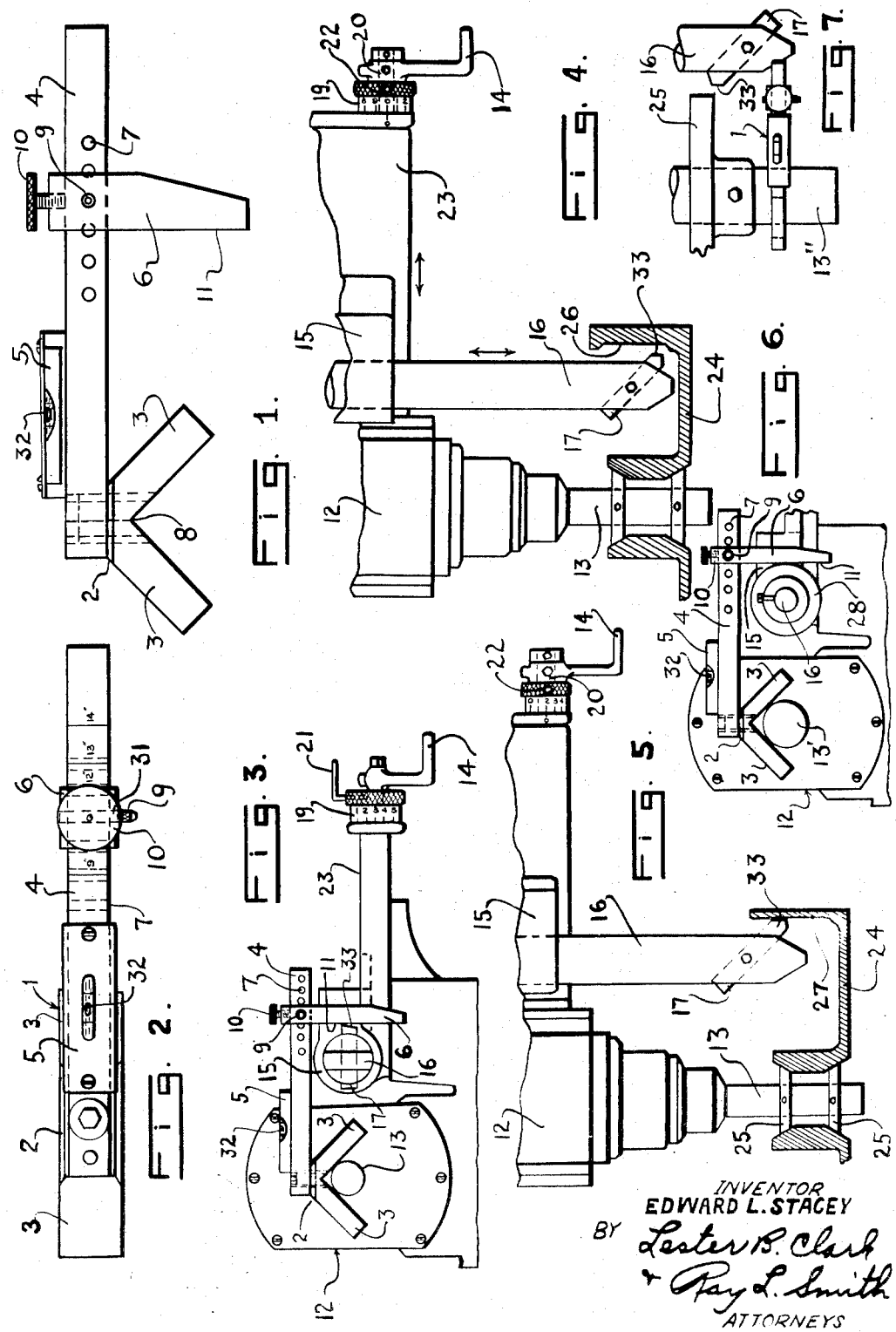
INVENTOR
EDWARD L. STACEY
BY Lester B. Clark
& Ray L. Smith
ATTORNEYS Patented Oct. 2, 1951

2,569,873

UNITED STATES PATENT OFFICE 2,569,873

METHOD OF SETTING OF TOOL FOR BRAKE DRUM MACHINING

Edward L. Stacey, Houston, Tex.

Application November 7, 1947, Serial No. 784,629

1 Claim. (Cl. 51—290)

This invention relates to an adaptable gauge setting tool and to a method of using the tool on a number of machines having tool stocks with axes parallel to and substantially level with the spindle axes of the machines so that the tool may be used by unskilled laborers to quickly and accurately gauge various pre-determined radial distances between the axes of spindles of various diameters and the operating edges of tool stock mounted, stock removing implements.

An object of this invention is to provide a tool having a V-block to be centered over the axes of machine spindles of various diameters, a spirit level mounted on a beam fixed to the V-block and extending perpendicularly to the axis thereof, and an arm which can be set at graduated positions on a beam fixed to the V-block and extending perpendicularly therefrom, so that the operating edges of tool stock mounted, stock removing implements will be set at pre-determined positions when their edges are engaged against the face of the arm coincidental with the leveling of the beam by the spirit level bubble.

Another object of this invention is to employ a tool of this kind with machines such as brake drum lathes in a method of enlarging the inner diameters of elements, such as automobile brake drums, to pre-determined dimensions, by following the steps of using the tool as an accurate and quick means of setting the operating edge of a tool stock mounted, stock removing implement at a pre-determined radial distance from the spindle axis, setting the micrometer of the transverse feeding mechanism of the machine at zero, chucking the element on the spindle, and then feeding the stock removing implement outwardly from the spindle and into the element as it is rotated, and stopping the transverse feeding when the micrometer shows a reading which gauges the pre-determined inner diameter to which the element is to be enlarged.

Still another object of this invention is to employ a tool of this kind with machines such as brake drum lathes in a method of turning down the outer diameters of elements, to pre-determined dimensions, by following the steps of using the tool as an accurate and quick means of setting the operating edge of a tool stock mounted, stock removing implement at a pre-determined radial distance from the spindle axis, setting the micrometer of the transverse feeding mechanism of the machine at zero, chucking the element on the spindle, and then feeding the stock removing implement inwardly toward the spindle and into the element as it is rotated, and stopping the transverse feeding of the tool when the micrometer shows a reading which gauges the pre-determined outer diameter to which the element is to be turned down.

Broadly this invention relates to a tool which can be employed by unskilled laborers in accurately and skillfully setting the operating edges of tool stock mounted, stock removing implements in pre-determined positions so that these edges may be moved into elements being rotated on machine spindles in order to enlarge the inner diameters, or turn down the outer diameters, to pre-determined dimensions.

With the foregoing and other objects in view reference is made to the drawings, in which:

Fig. 1 is an elevation of the gauge setting tool.

Fig. 2 is a plan view of the gauge setting tool.

Fig. 3 is an elevation of the gauge setting tool being used on a brake drum lathe to set the cutting tool in a pre-determined position.

Fig. 4 is a plan view of the lathe after the gauge setting tool has set the cutting tool and has been removed, and in this view the zero on the micrometer of the transverse feeding mechanism is shown in coincidence with the index mark on the machine base, and a brake drum in section is shown as being chucked on the lathe spindle.

Fig. 5 is a plan view which shows the cutting tool as having enlarged the brake drum inner diameter to the required size as is indicated visually by the numeral 2 on the micrometer being in coincidence with the index mark on the machine base.

Fig. 6 is an elevation of the gauge setting tool being used to set a grinder mounted on the tool stock, in a pre-determined position.

Fig. 7 is a fragmentary plan view which discloses how a cutting tool has been reversed in the tool stock to turn down an outer diameter, and in this view the gauge setting tool which has set the cutting tool at a pre-determined radial distance from the spindle axis is shown, and the cutting tool is shown as having been moved parallel with the spindle axis, after having been set, so that it is adjacent to the flanged element which is to be turned down.

Referring to the drawings in detail, the gauge setting tool 1 is shown as being comprised of the V-block 2 with its arms 3, the beam 4, the spirit level 5, the arm 6 which is shown as being positioned by one of the holes 7 which are spaced at known and pre-determined distances from a vertical center line passing through the apex 8 of the V-block. The arm 6 is shown as being held by this hole 7 and perpendicular to the beam 4 by means of the pin 9 and the set screw 10.

The structure and use of the gauge setting tool is best described by its application to automobile repair machine shops where it often occurs that several brake drum lathes may be in use, equipped with spindles or arbors of various diameters, to meet various requirements. These machine shops often employ comparatively unskilled workers and helpers to carry out routine operations.

One of these operations consists of the enlarging of worn automobile brake drum inner diameters to receive shims of certain standard outer diameters which are to be installed in the brake drums to re-line them. For instance, it may be desired to install a shim of 12.040" outer diameter in a brake drum of an original nominal 12" diameter which has become enlarged by wearing to some diameter intermediate between 12" and 12.040". The unskilled laborer cannot be relied upon to measure accurately the dimension to which the drum has been worn, subtract this diameter from the desired shim diameter, divide by a micrometer constant as 2, and then move the cutting tool against the worn brake drum, start the lathe rotating, and feed the cutting tool outwardly into the brake drum, and finally stop the operation when the micrometer recording the amount of transverse feeding reads the result of his calculations.

With the device and method of this invention it is not necessary for an unskilled laborer to make even simple calculations. He only has to know the nominal diameter of the drums on which he is to work. If the brake drum 24 to be worked upon is, for example, a 12" diameter brake drum, he takes the gauge setting tool, selects that hole 7 on the beam axis which corresponds to the adjacent index number 12 on the top face of the beam, and inserts the pin 9 through the hole 31 in the arm 6 and through this selected hole 7, and then tightens the set screw 10. This insures that the face 11 of the arm 6 extends perpendicularly to, and transversely of the beam axis. This hole 7 has been located a measured distance from the intersection of the beam axis and the line bisecting the V-block apex angle, and this insures that the nearest, or perpendicular distance from bisecting line to face 11 is 6", which is the radius of the brake drum to be worked.

The operator now takes the gauge setting tool to the brake drum lathe 12, which has a spindle or arbor diameter within the limitations of the V-block 2, sets the V-block 2 on the spindle 13, and levels the beam by means of the bubble 32 of the spirit level 5. At the same time the handle 14 is turned so that the tool stock retainer 15, which carries the tool stock 16 and the cutting tool 17, is moved across the bed plate 23 toward the spindle axis until the operating edge 33 of the cutting tool 17 is against the face 11 of the arm 6 at a point nearest the spindle axis, and is consequently set from the spindle axis at a distance equal to the brake drum radius of 6". The gauge setting tool 1 is then put away.

The micrometer 19 is then loosened on the shaft 20 by taking an Allen wrench 21 and loosening the Allen set screw 22. The micrometer is then turned until the zero mark thereon coincides with the index mark on the bed plate 23. The operator then tightens the set screw 22 to bind against the shaft 20 and hold the micrometer in fixed position. The brake drum 24 is then mounted on the spindle 13 by means of chucks 25 and the tool stock 16 is then fed longitudinally outward by means of any well known mechanism, not shown, until the operating edge 33 of the cutting tool 17 is at the inner corner of the inside periphery 26 of the brake drum 24. The lathe spindle 13 is then rotated and the handle 14 is turned in a direction to feed the cutting tool 17 into the inner brake drum periphery 26 and the feeding operation is continued until the brake drum 24 has been enlarged to the inner diameter 27, as shown in Fig. 5. At this instant the turning of the handle 14 and the movement of the micrometer 19 has brought the numeral 2 on the micrometer 19 into coincidence with the index mark on the bed plate 23 and this numeral 2 thus indicates to the unskilled operator that the brake drum 24 has been enlarged by .040", an even multiple of 2, to receive a shim of 12.040" outer diameter.

The application of the device and method of this invention is not limited to the enlarging of inner diameters but can also be used in the turning down outer diameters to desired pre-determined dimensions. Fig. 7 shows how the cutting tool 17 can be reversed in direction of cutting so that it can be fed into, and can turn down, the outer diameter of an element such as the flanged element 25, which is being rotated on the lathe spindle. In this view the arm 6 has been fixed on the beam 4 so that the face 11 is outward from the machine spindles, and the handle 14 has been rotated to bring the operating edge 33 of the cutting tool 17 against the face 11.

By any well known mechanism, not shown, the tool stock 16 can be fed longitudinally, or in a direction parallel with the spindle axis and toward the bed plate 23. Fig. 7 shows how this has been done after the cutting tool 17 has first been set by the gauge setting tool, and in this view the operating edge 33 of the cutting tool is shown as having been moved opposite the flanged element 25 which is to be turned down. It now only remains for the micrometer 19 to be set at zero, and then the handle 14 can be turned to feed the cutting tool 17 into the flanged element 25 until the micrometer reading shows that the flange has been turned down to a predetermined outer diameter.

A grinding wheel can also be set by the device and method of this invention, as well as a cutting tool. Fig. 6 shows such a grinding wheel 28 mounted in any well known manner on a modified tool stock 16. This figure shows the grinder 28 being set to grind out and enlarge an inner diameter, but the grinder may also be set by the gauge setting tool to grind down outer diameters in the same manner as the gauge is shown being used in Fig. 7 to set the cutting tool 17 for the same purpose.

Referring to Figs. 3, 6 and 7 of the drawings, it is pointed out that the same gauge setting tool 1 has been employed to set dimensions from lathe spindles 13 in Fig. 3, and 13' and 13" in Figs. 6 and 7 respectively, and that each of these three lathe spindles are of different diameters, as will often be the case in machine shops having several machines.

It is obvious that changes may be made in the construction and application of the invention without departing from the substance and spirit thereof. It is not therefore desired to confine the invention to the exact form of gauge setting tool and to the exact method descibed herein, but it is desired to include all such forms and methods which may properly come within the scope thereof.

What is claimed is:

A method of dressing to a predetermined diameter a cylindrical element which is mounted concentrically on the cylindrical axially horizontally extending spindle of a machine, the method step comprising, inserting a pin in a hole through the arm of a gauge setting tool and through the beam thereof and tightening means to fix the arm at a precisely predetermined point on the beam so that a face of the arm extends perpendicular to the beam axis and parallel to the axis of a V-block fixed to one end of the beam, positioning the V-block on the machine spindle, transversely moving the operating edge of a stock removing implement of the machine to engage the face at a time when the beam is levelled, positioning the micrometer of the transverse feeding mechanism of the machine at a predetermined setting corresponding with the radial distance from spindle axis to the face as indicated by the pin setting in the beam, and rotating the element on the spindle while moving the implement against the element to remove stock therefrom until the micrometer indicates the pre-determined diameter to which the element is to be turned.

EDWARD L. STACEY.

REFERENCES CITED

The following references are of record in the file of this patent:

UNITED STATES PATENTS

| Number | Name | Date |
|---|---|---|
| 323,826 | Osborn | Aug. 4, 1885 |
| 574,232 | Alrich | Dec. 29, 1896 |
| 868,074 | Clark | Oct. 15, 1907 |
| 1,502,806 | Berg | July 29, 1924 |
| 1,534,393 | Joseph | Apr. 21, 1925 |
| 1,554,610 | Webster | Sept. 22, 1925 |
| 1,598,248 | Paine | Aug. 31, 1926 |
| 1,686,318 | Gallasch | Oct. 2, 1928 |
| 1,891,185 | Miller | Dec. 13, 1932 |
| 1,898,136 | Miller et al. | Feb. 21, 1933 |
| 1,902,629 | Evans | Mar. 21, 1933 |
| 2,015,356 | Thurber | Sept. 24, 1935 |
| 2,032,864 | Begg et al. | Mar. 3, 1936 |

OTHER REFERENCES

Automobile Trade Journal, June 1933, page 57.